United States Patent

West

[15] 3,695,071
[45] Oct. 3, 1972

[54] VEHICLE WHEEL IMMOBILIZING APPARATUS

[72] Inventor: Jon R. West, 6835 S. 262nd., Kent, Wash. 98031

[22] Filed: Oct. 14, 1971

[21] Appl. No.: 189,087

[52] U.S. Cl. ........................70/225, 70/259, 188/32
[51] Int. Cl. ........................B60r 25/00, B60t 3/00
[58] Field of Search............70/14, 18, 225, 226, 259; 188/32

[56] References Cited

UNITED STATES PATENTS

| 1,359,483 | 11/1920 | Boswell | 70/259 X |
| 3,537,548 | 11/1970 | Jeppesen | 188/32 |

FOREIGN PATENTS OR APPLICATIONS

| 227,102 | 4/1963 | Austria | 70/259 |

Primary Examiner—Albert G. Craig, Jr.
Attorney—Christensen & Sanborn

[57] ABSTRACT

The apparatus comprises a wheel stop device which in turn has a plurality of arms that are adapted to be transversely arranged about a common center line, in angularly spaced relationship to one another, and which are equipped with gripper elements on the relatively outlying end portions thereof, for engagement about the periphery of the wheel, on each side thereof, when the device is applied to the wheel, on one side thereof, such that the center line of the arms extends adjacent the axis of the wheel on a parallel thereto. The arms are interconnected and fixed against relative rotation about the line, by means which enable at least one of the arms to be reciprocated in the transverse plane thereof, for purposes of engaging and disengaging the gripper elements with respect to the wheel. There are, however, retainer means on the device for securing the one arm against reciprocation, in the engaged position of the elements; and the apparatus further comprises a shield which is adapted to be superposed on the device to present across to the retainer means when the arms are disposed in the engaged position of the elements. The shield in turn is normally releasably interlocked to the device, in the relatively superposed position thereof.

20 Claims, 6 Drawing Figures

VEHICLE WHEEL IMMOBILIZING APPARATUS

FIELD OF THE INVENTION

This invention relates to apparatus for immobilizing wheeled vehicles, and in particular, to apparatus of this nature which is employed in immobilizing the vehicle under circumstances where there is a likelihood that at least an occasional attempt will be made to free the vehicle by forceful means including the use of various cutting and abrading tools. Examples are where the apparatus is used for theft prevention or impoundment of the vehicle.

BACKGROUND OF THE INVENTION INCLUDING CERTAIN OBJECTS THEREOF

In recent years, various types of wheel stop devices have been disclosed for purposes of immobilizing wheeled vehicles. See for example U. S. Pat. No. 3,537,548 to Jeperson. However, these devices have provided inadequate security against tampering where they have been used by parking lot owners and the like who demand a substantial fee for release of the impounded vehicle. One object of the invention therefore, is to provide an improved wheel stop device that is safeguarded against tampering in every known manner, including tampering conducted with the assistance of power-driven cutting and abrading tools. Another object is to provide a device of this nature which is secured on the wheel and then safeguarded behind a shield that is interlocked with the device so as to prevent access to the means by which the device is secured on the wheel. A further object is to provide a device of this nature which can be removed from the wheel only by steps effected parallel to and crosswise of the axis of the wheel, and which is so shrouded by the shield that these steps are possible only after the shield itself is removed. Other objects include the provision of a device of this nature which is safeguarded by a shield that is interlocked with the device by means that are also shrouded against tampering; and the provision of a device of this nature which is safeguarded in such a way as to provide the convenience and ease of handling necessary to all devices of this nature.

Still further objects will become apparent from the description of the invention which follows hereafter.

SUMMARY OF THE INVENTION

These and other objects and advantages are realized by a wheel immobilizing apparatus of my invention which comprises a wheel stop device having a plurality of arms that are adapted to be transversely arranged about a common center line, in angularly spaced relationship to one another, and which are equipped with gripper elements on the relatively outlying end portions thereof, for engagement about the periphery of the wheel, on each side thereof, when the device is applied to the wheel, on one side thereof, such that the common center line of the arms extends adjacent the axis of the wheel on a parallel thereto. The wheel stop device also comprises means for forming a connection between the arms and fixing the arms against relative rotation about the center line thereof, whereby at least one of the arms is reciprocable in the transverse plane thereof, to engage and disengage the gripper elements with respect to the wheel. The one arm can be secured against reciprocation, however, in the engaged position of the elements, by retainer means on the device.

With these features, the device lends itself to being safeguarded against tampering by a shield which is superposable on the device so as to prevent access to the retainer means when the arms are disposed in the engaged position of the elements, and which is accompanied by means for interlocking the shield with the device, in the relatively superposed position thereof. This is particularly true where the retainer means are interengageable with the device adjacent the center line of the arms, and the shield is superposable on the device, in crosswise registry with the line, and adapted to extend inwardly toward the wheel about the retainer means.

The device also lends itself to the employment of a single means for both interlocking the shield with the device, and interlocking the arms with the connection therebetween. This is particularly true where the means for forming the connection, are interengageable with the arms in the direction of the line, and adapted to project outwardly from the wheel, beyond the arms, to provide a keeper with which to releasably latch the shield to the arms.

This arrangement in turn lends itself to the use of a strongbox which is engageable on the projecting portion of the connection to shroud both the keeper and the latch against tampering. The latch preferably has means thereon for locking it against removal, after it is engaged with the keeper and enclosed in the box.

In the presently preferred embodiments of the invention, the arms are rigid and elongated in the transverse planes thereof. A cleated, staple-like tenon is mortised through complemental apertures in the arms, to interconnect them with one another, and fix them against relative rotation. Afterwards, the shield is hasped onto the tenon, and a latch pin such as the shackle of a padlock, is passed through the tenon to interlock the shield to the device and the arms to the tenon. Preferably, however, an open-ended, slot-backed strongbox is hasped onto the tenon beforehand, to receive and enclose the padlock therein.

In these embodiments, moreover, the one reciprocable arm has a longitudinally extending slot therein, and the tenon is slidably engaged in the slot, and equipped with clamp means on the cleat thereof with which to secure the cleat to the one arm in the engaged position of the elements. The other arms may each have a series of mutually registerable slots with which to shift them lengthwise in relation to the tenon as well.

Normally, the arms are also fixed against rotation in relation to the vehicle, such as where chocks are provided on the other arms for engagement between the wheel and the ground under the vehicle.

The shield is preferably rounded and has an inwardly directed skirt thereon that is slotted to pass the arms therethrough.

The gripper elements are presently rigid U-shaped reentrant flanges on the outlying ends of the arms.

BRIEF DESCRIPTION OF THE DRAWINGS

These features will be better understood by reference to the accompanying drawings which illustrate one of the presently preferred embodiments.

In the drawings.

DESCRIPTION OF THE PREFERRED EMBODIMENT

Figure 1:
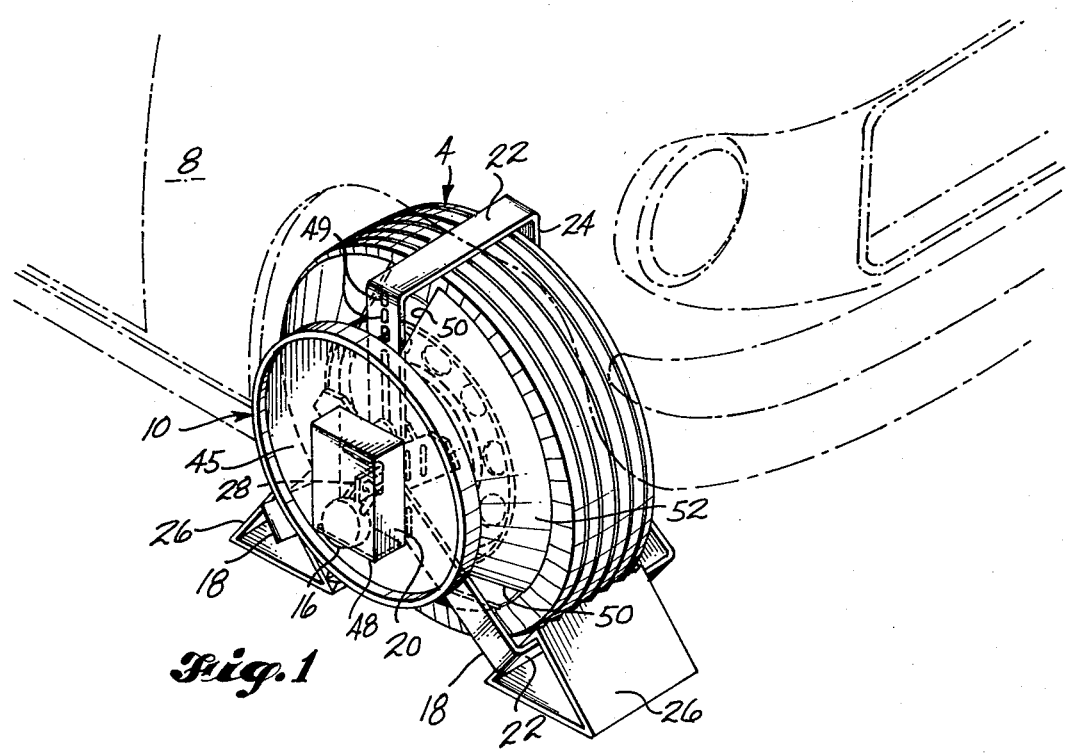
FIG. 1 is an assembled perspective view of the device, shield, strongbox and padlock in use.
Figure 2:
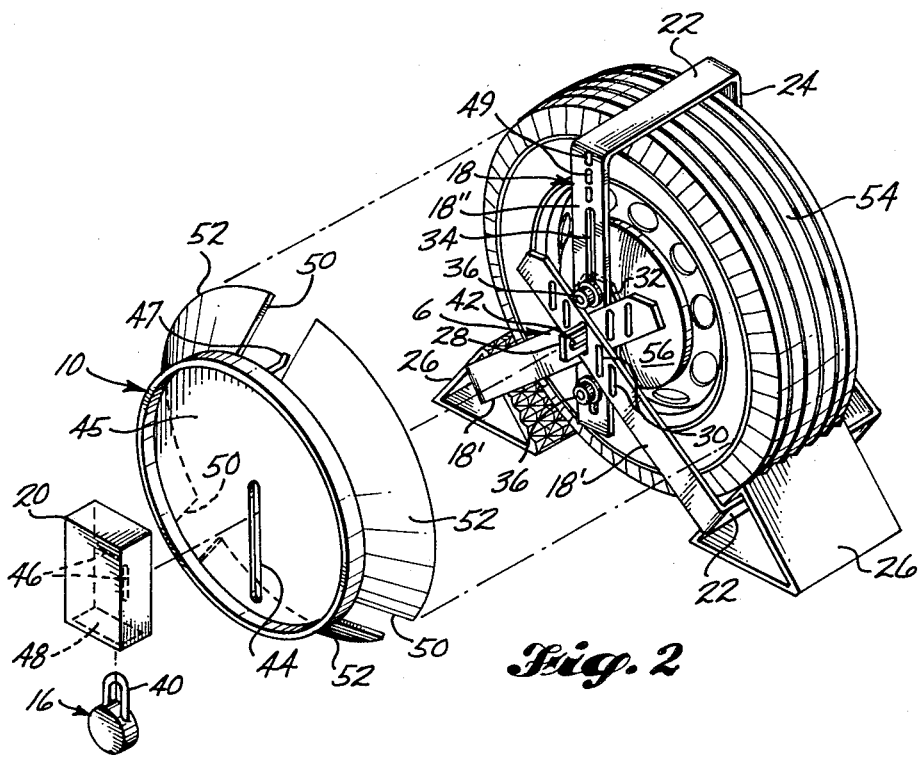
FIG. 2 is a partly exploded operational view of the unit, with the shield, box, and lock relatively removed from the device.
Figure 3:
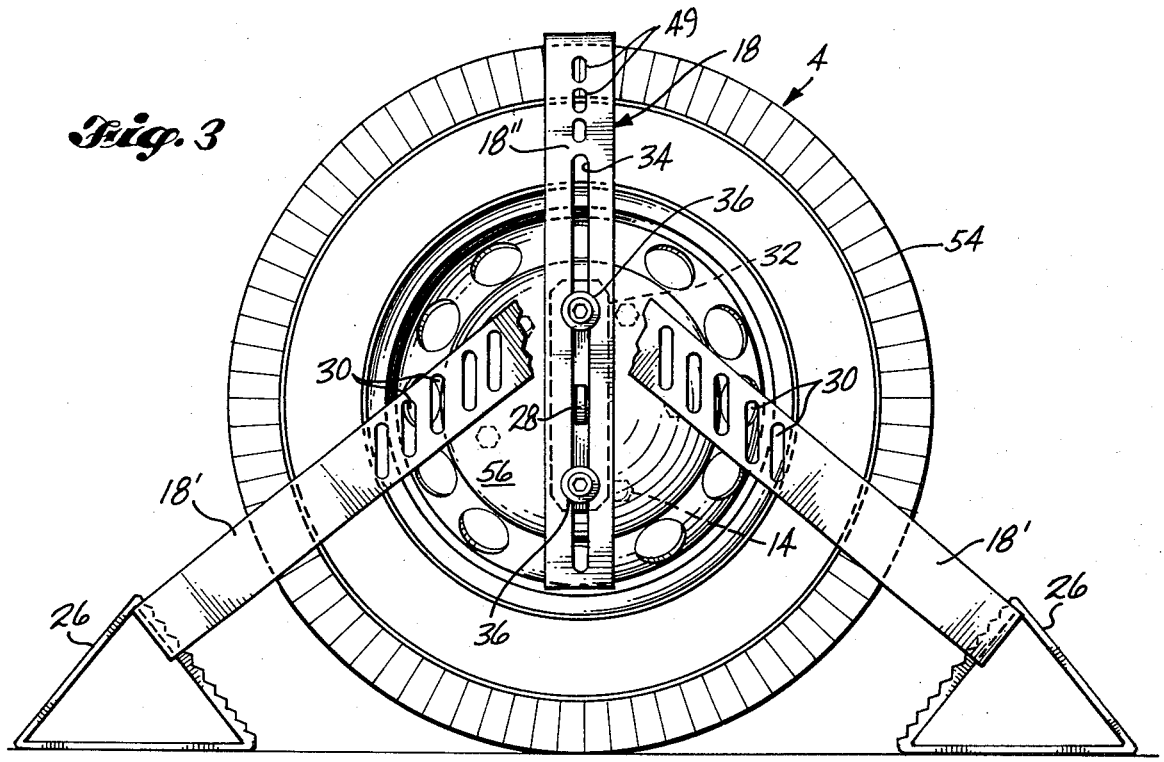
FIG. 3 is a part side elevational view of the device in use.
Figure 4:
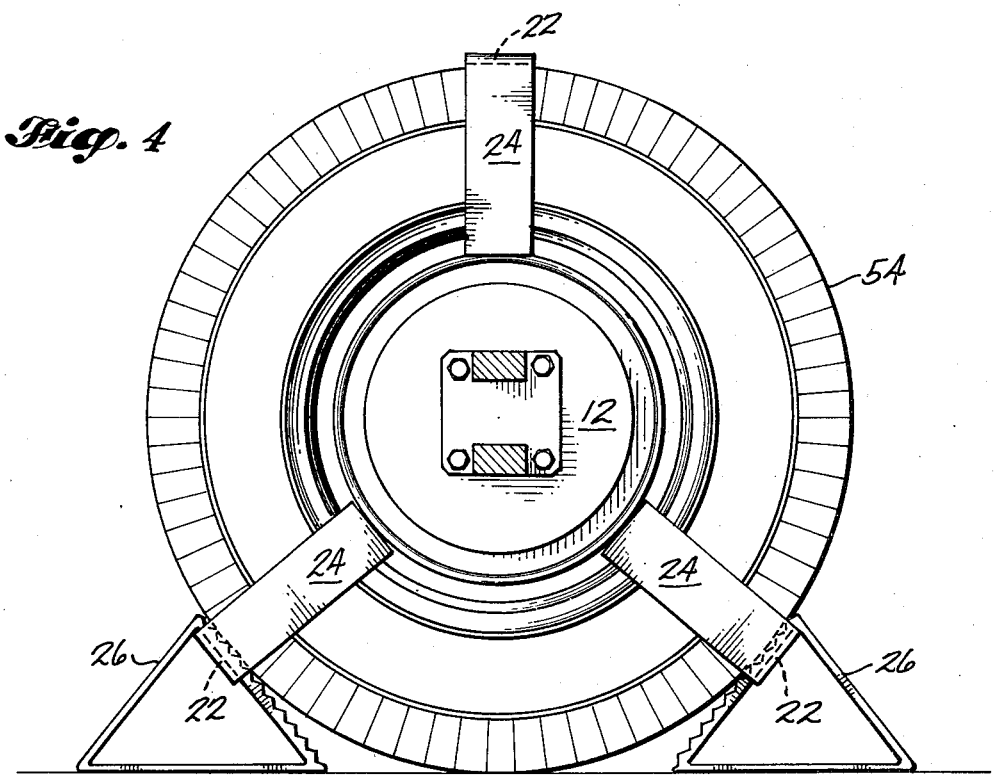
FIG. 4 is a corresponding view of the device as seen from the inside of the wheel.
Figure 5:
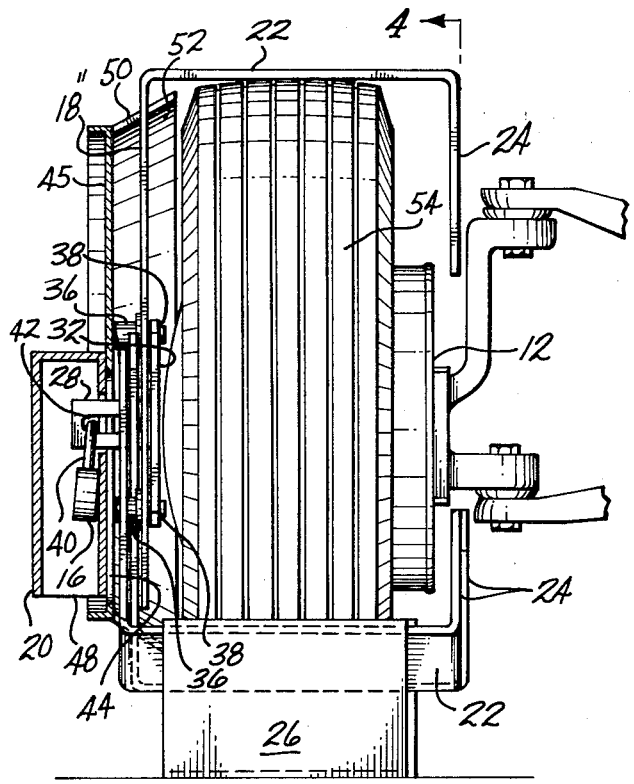
FIG. 5 is a part cross-sectional end elevational view of the unit in use.
Figure 6:
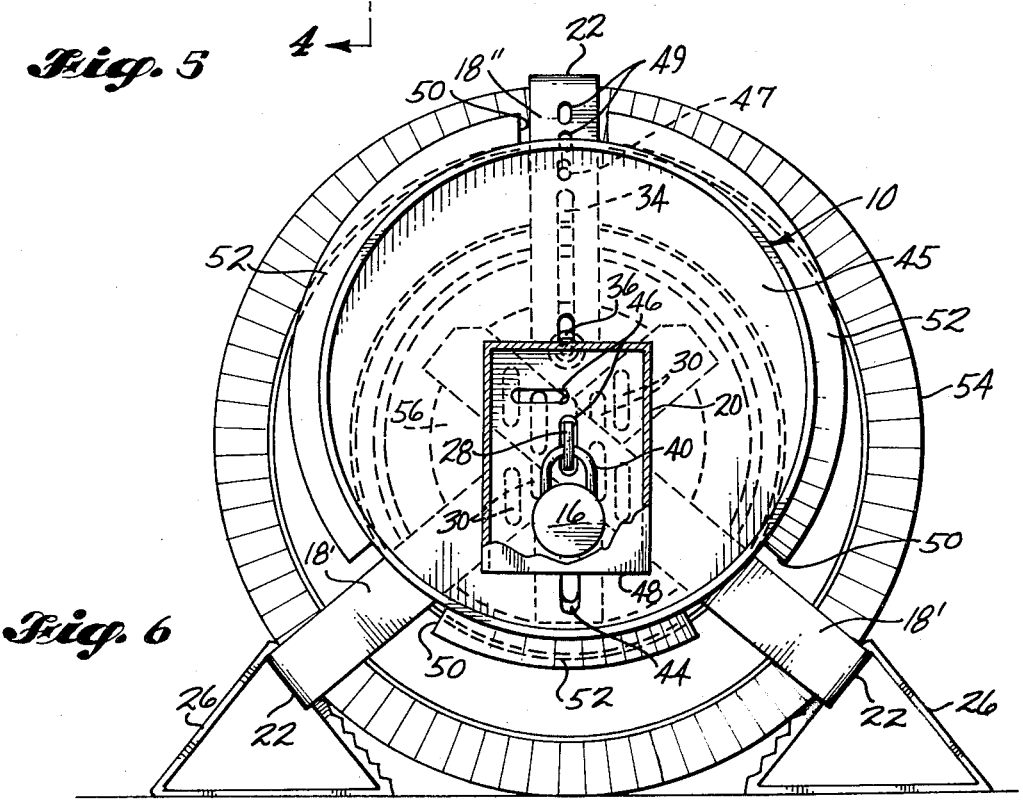
FIG. 6 is a part cross-sectional side elevational view of the unit in use.

Referring to the drawings, it will be seen that the unit 2 is applied to the outside of the wheel 4 and in general comprises an adjustably tenon-and-mortise-connected three-armed spider 6 which is drawn up tight about the periphery of the wheel and chocked against rotation with respect to the body or chassis 8 of the vehicle. The unit 2 also comprises a disc-shaped outwardly-rimmed and inwardly-skirted shield 10 which is interlocked with the spider, over the hub 12 of the wheel, to prevent access to the lug bolts 14 by which the wheel is fastened to an axle of the vehicle. A conventional padlock 16 serves to interlock the spider and the shield, as well as to interlock the arms 18 of the spider, as shall be explained. The padlock 16 is shrouded by an open-ended strongbox 20 which is also interlocked with the spider by the padlock.

The three arms 18 of the spider are arranged at 120° intervals on the wheel, so that one pair 18' of the same is inclined at opposing 45° angles with respect to the underlying ground, and the third 18'' is disposed in a vertical plane with respect to the ground. All three arms have U-shaped reentrant flanges 22 on the outlying ends thereof, the reentrant ears 24 of which are of such length as to reach behind the hub 12 of the wheel when the flanges are clamped about the periphery of the same. In addition, the 45° oriented arms 18' have triangularly-shaped chocks 26 welded thereto, for engagement between the wheel and the ground at the flanges 22 of the same.

The arms of the spider are interconnected with one another through the medium of a slotted, flat rectangular staple-like tenon 28 which is carried on the vertically oriented arm 18'' in a laterally projecting, vertically oriented condition thereon, and adjustably mortised into pairs of obliquely oriented slots 30 in the 45° oriented arms 18'. The slots 30 are spaced apart from one another so as to account for varying diameters of the wheel, and are registered with one another, from arm to arm, after the arms are chocked against the wheel as in the drawings. The tenon 28 meanwhile, is shifted into an opposing position, to mortise with the slots 30, after the vertically oriented arm 18'' is drawn down against the wheel at the top. Adjustability between the tenon 28 and the arm 18'' is achieved by cleating the tenon to the arm on a plate-like shoe 32 which is slidable in relation to the arm and has the tenon laterally outstanding therefrom in an elongated slot 34 running lengthwise of the arm. After the tenon is registered and engaged in the slots 30 of the 45° oriented arms, two Allen-headed capscrews 36 in the slot 34 of the vertically oriented arm, are threadedly engaged in end adjacent holes 38 of the shoe, and tightened against the arm 18'' to secure the shoe in position.

The arms are then interlocked with one another, by passing the U-shaped shackle 40 of the padlock through the slot 42 in the tenon which is disposed to receive the shackle on the outward side of the spider.

In practice, the arms 18 of the spider are generally padlocked to one another only after the shield 10 is added to the same, there being an elongated vertically oriented slot 44 in the disc 45 of the shield by which the shield is engaged over the tenon for this purpose. The length of the slot 44 enables the shield to be adjusted in the vertical direction until it assumes the necessary position to prevent access to the fastener means 14 of the hub. In this position, a hook 47 on the upper inside face of the disc, engages in one of several oblong holes 49 in the upper end of the vertically oriented arm 18'', to fix the condition of the shield on the wheel.

The back wall of the strongbox 20 is also slotted, and in practice the strongbox is also added to the tenon before the assembly is padlocked, there being a pair of oppositely transversely oriented slots 46 in the wall of the box by which the box can be oriented in either an upright position or a horizontal position before the lock is introduced through the open end 48 thereof for engagement on the tenon. Preferably, the box is applied to the tenon in the vertical position to add to the inaccessibility of the lock; however, where the vehicle is parked next to a curb, it may be necessary to apply it in the alternate position.

Apart from slots 50 for the arms, the skirt 52 of the shield is adapted to fit tightly against the side wall of the tire 54 to prevent access to the hub and the tenon, between the shield and the wheel.

The ears 24 of the arms 18 prevent one from freeing the device by deflating the tire.

The mating rectangular cross sections of the tenon 28 and the slots 30, 44 and 46, prevent relative rotation of the various components.

Preferably, a sponge pad (not shown) is secured to the inward side of the shoe 32 to prevent damage to the hub cap 56 of the wheel.

What is claimed is:

1. In apparatus for immobilizing a wheeled vehicle, a wheel stop device having a plurality of arms that are adapted to be transversely arranged about a common center line, in angularly spaced relationship to one another, and which are equipped with gripper elements on the relatively outlying end portions thereof, for engagement about the periphery of the wheel, on each side thereof, when the device is applied to the wheel on one side thereof, such that the common center line of the arms extends adjacent the axis of the wheel on a parallel thereto, means for forming a connection between the arms and fixing the arms against relative rotation about the common center line thereof, whereby at least one of the arms is reciprocable in relation to the common center line thereof, to engage and disengage the gripper elements with respect to the wheel, retainer means on the device whereby the one arm can be secured against reciprocation in the engaged position of the elements, and means on the device for engagement between the wheel and the ground to immobilize the wheel.

2. The apparatus according to claim 1 further comprising a shield which is superposable on the device so as to prevent access to the retainer means when the arms are disposed in the engaged position of the elements, and means for interlocking the shield with the device, in the relatively superposed position thereof.

3. The apparatus according to claim 2 wherein the retainer means are interengageable with the device adjacent the common center line of the arms, and the shield is superposable on the device, in crosswise registry with the line, and adapted to extend inwardly toward the wheel about the retainer means.

4. The apparatus according to claim 2 wherein the means for interlocking the shield with the device, also operate to interlock the arms with the connection therebetween.

5. The apparatus according to claim 4 wherein the means for forming the connection, are interengageable with the arms in the direction of the common center line, and adapted to project outwardly from the wheel, beyond the arms, to provide a keeper with which to releasably latch the shield to the arms.

6. The apparatus according to claim 5 further comprising a strongbox which is engageable on the projecting portion of the connection, to shroud both the keeper and the latch against tampering.

7. The apparatus according to claim 6 further comprising a latch having means thereon for locking it against removal after it is engaged with the keeper and enclosed in the box.

8. The apparatus according to claim 2 wherein the arms are rigid and elongated in the transverse planes thereof.

9. The apparatus according to claim 8 wherein a cleated, staple-like tenon is mortised through complemental apertures in the arms to interconnect the arms with one another and to fix them against relative rotation.

10. The apparatus according to claim 9 wherein the shield is hasped onto the tenon, and a latch pin is passed through the tenon to interlock the shield to the device and the arms to the tenon.

11. The apparatus according to claim 10 further comprising an open-ended, slot-backed strongbox which is hasped onto the tenon to receive and enclose the latch pin therein.

12. The apparatus according to claim 9 wherein the one reciprocable arm has a longitudinally extending slot therein, and the tenon is slidably engaged in the slot and equipped with clamp means on the cleat thereof with which to secure the cleat to the one arm in the engaged position of the elements.

13. The apparatus according to claim 12 wherein the other arms each have a series of mutually registerable slots with which to shift them relation in relation to the tenon.

14. The apparatus according to claim 1 wherein the other arms have chocks thereon for engagement between the wheel and the ground under the vehicle.

15. The apparatus according to claim 3 wherein the shield is rounded and has an inwardly directed skirt thereon that is slotted to pass the arms therethrough.

16. The apparatus according to claim 1 wherein the gripper elements are rigid U-shaped reentrant flanges on the outlying ends of the arms.

17. In combination, a wheeled vehicle, a wheel stop device applied to the wheel on one side thereof, having a plurality of arms that are transversely arranged about a common center line extending adjacent axis of the wheel on a parallel thereto, and in angularly spaced relationship to one another, and which are equipped with gripper elements on the relatively outlying end portions thereof, which are engaged about the periphery of the wheel, on each side thereof, means forming a connection between the arms and fixing the arms against relative rotation about the common center line thereof, whereby at least one of the arms is reciprocable in relation to the common center line thereof, to disengage the gripper elements with respect to the wheel, retainer means on the device operating to secure the one arm against reciprocation in the engaged position of the elements, and means on the device for engagement between the wheel and the ground to immobilize the wheel.

18. The combination according to claim 17 further comprising a shield which is superposed on the device so as to prevent access to the retainer means, and means for interlocking the shield with the device, in the relatively superposed position thereof.

19. The combination according to claim 18 wherein the retainer means are interengaged with the device adjacent the center line of the arms, and the shield is superposed on the device, in crosswise registry with the common center line, and extends inwardly toward the wheel about the retainer means.

20. The combination according to claim 19 wherein the connection between the arms is disposed on the common center line and projects outwardly from the wheel, beyond the arms, to provide a keeper with which to releasably latch the shield to the arms, and there is a strongbox engaged on the projecting portion of the connection, to shroud both the keeper and the latch against tampering.

* * * * *

PO-1050
(5/69)

UNITED STATES PATENT OFFICE
CERTIFICATE OF CORRECTION

Patent No. 3,695,071                     Dated    October 3, 1972

Inventor(s)   Jon R. West

It is certified that error appears in the above-identified patent and that said Letters Patent are hereby corrected as shown below:

Abstract, line 30 "present across" in the first instance should be -- present access --.

Claim 13, line 3, "relation" in the first instance should be -- lengthwise --.

Claim 17, line 4, after "adjacent"  -- the -- is missing.

Signed and sealed this 3rd day of April 1973.

(SEAL)
Attest:

EDWARD M.FLETCHER,JR.                    ROBERT GOTTSCHALK
Attesting Officer                        Commissioner of Patents